United States Patent
Saruwatari et al.

(10) Patent No.: US 8,305,780 B2
(45) Date of Patent: Nov. 6, 2012

(54) POWER CONVERSION APPARATUS CONTROLLING OUTPUT OF INVERTER BASED ON POWER VALUE

(75) Inventors: Hirotaka Saruwatari, Osaka (JP); Takeshi Kokura, Osaka (JP); Keisuke Shimatani, Osaka (JP); Keiichi Yoshisaka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 166 days.

(21) Appl. No.: 12/934,889

(22) PCT Filed: Mar. 2, 2009

(86) PCT No.: PCT/JP2009/000934
§ 371 (c)(1),
(2), (4) Date: Sep. 27, 2010

(87) PCT Pub. No.: WO2009/119010
PCT Pub. Date: Oct. 1, 2009

(65) Prior Publication Data
US 2011/0026280 A1 Feb. 3, 2011

(30) Foreign Application Priority Data
Mar. 28, 2008 (JP) .................................. 2008-088548

(51) Int. Cl.
*H02M 5/45* (2006.01)
(52) U.S. Cl. ........................................................ 363/37
(58) Field of Classification Search .............. 363/34–38, 363/95, 97–98; 323/282, 284
See application file for complete search history.

(56) References Cited

U.S. PATENT DOCUMENTS

| 5,272,429 | A   | * | 12/1993 | Lipo et al. ...................... 318/808 |
| 7,274,181 | B2  | * | 9/2007  | Schrom et al. ................. 323/284 |
| 2002/0125871 | A1 | * | 9/2002 | Groom et al. ................. 323/284 |
| 2002/0145897 | A1 | * | 10/2002 | Hanaoka et al. ................. 363/84 |
| 2004/0189217 | A1 | * | 9/2004 | Ishihara et al. ................. 315/291 |
| 2007/0274114 | A1 | * | 11/2007 | Neacsu ......................... 363/132 |

FOREIGN PATENT DOCUMENTS

| JP | 60-228840 A | 11/1985 |
| JP | 62-100177 A | 5/1987 |
| JP | 2002-58166 A | 2/2002 |
| JP | 2004-222421 A | 8/2004 |
| JP | 2007-151230 A | 6/2007 |
| JP | 2008-61322 A | 3/2008 |

* cited by examiner

*Primary Examiner* — Adolf Berhane
*Assistant Examiner* — Jeffrey Gblende
(74) *Attorney, Agent, or Firm* — Birch, Stewart, Kolasch & Birch, LLP.

(57) ABSTRACT

The invention relates to a power conversion apparatus including a converter circuit and an inverter circuit. The invention allows more precise output control of the inverter circuit than a power conversion apparatus in which the output control is performed based on a current value only, thereby improving operation efficiency. A current sensor detects input current of the inverter circuit, and a voltage sensor detects input voltage of the inverter circuit. A power value calculator section in an inverter microcomputer obtains a power value based on the input current and the input voltage. The inverter microcomputer and the control microcomputer perform droop control of reducing the output of the inverter circuit to make the power value smaller than a predetermined power value.

3 Claims, 3 Drawing Sheets

US 8,305,780 B2

POWER CONVERSION APPARATUS CONTROLLING OUTPUT OF INVERTER BASED ON POWER VALUE

TECHNICAL FIELD

The present invention relates to power conversion apparatuses, particularly to control of output of an inverter circuit.

BACKGROUND ART

Power conversion apparatuses including a converter circuit which converts AC power of an AC power supply to DC power, and an inverter circuit which converts the DC power of the converter circuit to AC power of a predetermined frequency have been known. For example, an example of such a power conversion apparatus has generally been known as disclosed by Patent Document 1, in which a plurality of diodes are bridge-connected to constitute the converter circuit, and a plurality of switching elements are bridge-connected to constitute the inverter circuit.

An example of a method for controlling output of an inverter circuit which controls and drives a motor etc. has been known as disclosed by Patent Document 2, for example. In this example, droop control is performed by detecting current input to the inverter circuit, and reducing an output frequency of the inverter circuit in such a manner that the detected current value does not exceed a predetermined value.

CITATION LIST

Patent Document
Patent Document 1: Japanese Patent Publication No. 2004-222421
Patent Document 2: Japanese Patent Publication No. S60-228840

SUMMARY OF THE INVENTION

Technical Problem

When the output of the inverter circuit is controlled based on the current input to the inverter circuit like the latter example, fluctuations in voltage are not taken into account. Thus, the output of the inverter circuit is not controlled very precisely. Specifically, when the output of the inverter circuit is controlled for preventing overheating of components of the power conversion apparatus, for example, an amount of heat generated by the components varies depending on the power obtained from the current and the voltage. Therefore, in the configuration of the latter example in which the output of the inverter circuit is controlled based on the current only, a threshold has to be set to be on the safe side in consideration of the fluctuations in voltage. This limits the output of the inverter circuit, and reduces efficiency of operation.

In view of the foregoing, the invention has been achieved. The invention is directed to a power conversion apparatus including a converter circuit and an inverter circuit. An object of the invention is to provide a power conversion apparatus which allows more precise output control of the inverter circuit than a power conversion apparatus in which the output control is performed based on a current value only, thereby improving the operation efficiency.

Solution to the Problem

To achieve the above-described object, a power conversion apparatus (1) of the present invention is configured to detect current and voltage input to an inverter circuit (3) to obtain a power value from the detected current and voltage, and to perform droop control of reducing the output of the inverter circuit (3) based on the power value.

Specifically, a first aspect of the invention is directed to a power conversion apparatus including: a converter circuit (2) which is connected to an AC power supply (5), and converts AC power to DC power; and an inverter circuit (3) which converts the DC power converted by the converter circuit (2) to AC power of a predetermined frequency.

The power conversion apparatus further includes: a current detector means (17) which is configured to detect input current input from the converter circuit (2) to the inverter circuit (3); a voltage detector means (15) which is configured to detect input voltage input from the converter circuit (2) to the inverter circuit (3); a power value calculator means (33) which is configured to obtain a power value from the input current detected by the current detector means (17) and the input voltage detected by the voltage detector means (15); and a droop control means (30, 40) which is configured to reduce output of the inverter circuit (3) in such a manner that the power value obtained by the power value calculator means (33) is smaller than a predetermined power value.

With the above-described configuration, the power value can be obtained by the power value calculator means (33) based on the input current of the inverter circuit (3) detected by the current detector means (17), and the input voltage of the inverter circuit (3) detected by the voltage detector means (15), thereby controlling the output of the inverter circuit (3) by the droop control means (30, 40) in such a manner that the power value is lower than the predetermined power value. Thus, the output control can be performed more precisely as compared with the case where the output control is performed based on the current value only. Specifically, the voltage is detected in addition to the current, and the power value is obtained from the voltage and the current. As a result, a power value directly associated with an amount of heat generated by the components of the apparatus (1) can precisely be obtained, thereby eliminating the need to provide an unwanted allowance (e.g., to set a threshold value of the current lower) in controlling the output of the inverter circuit (3).

Thus, as compared with the conventional configuration in which the output of the inverter circuit (3) is controlled based on the current only, the output of the inverter circuit (3) can be controlled more precisely, thereby allowing more efficient operation of the power conversion apparatus (1).

With the above-described configuration, the droop control means (30, 40) is configured to reduce the output of the inverter circuit (3) when the power value remains higher than or equal to a droop control start value (W_H), which is a value lower than the predetermined power value, for a predetermined period of time or longer (a second aspect of the invention).

The predetermined period of time is determined as a period in which erroneous detection due to noise etc. would not occur.

Thus, the droop control of reducing the output of the inverter circuit (3) can reliably be performed based on the power value obtained from the input current and the input voltage of the inverter circuit (3). As described above, since the droop control means is configured to start the droop control when the power value remains higher than or equal to the droop control start value (W_H) for the predetermined period of time or longer, the droop control can be started only when the power value is surely higher than or equal to the droop control start value (W_H), and the droop control is required, without being affected by noise contained in the current and the voltage.

While the output of the inverter circuit (3) is reduced, the droop control means (30, 40) is preferably configured to finish the output reduction when the power value remains lower than or equal to a droop control stop value (W_L), which is a value lower than the droop control start value (W_H), for a predetermined period of time or longer (a third aspect of the invention).

The predetermined period of time is determined as a period in which erroneous detection due to noise etc. would not occur.

Thus, when the power value is reduced, and the output of the inverter circuit (3) no longer has to be reduced, the droop control of reducing the output of the inverter circuit (3) is finished, and the output can be returned to the required output. As described above, since the droop control means is configured to finish the droop control when the power value remains lower than or equal to the droop control stop value (W_L) for the predetermined period of time or longer, the droop control can be finished only when the power value is surely lower than or equal to the droop control stop value (W_L), and the droop control is not required, without being affected by noise contained in the current and the voltage.

The converter circuit (2) preferably includes a plurality of switching elements constituting a rectifier circuit for rectifying three-phase AC power, and a reactor (7) is preferably provided between the AC power supply (5) and the converter circuit (2) (a fourth aspect of the invention).

With the configuration in which the plurality of switching elements constitute the rectifier circuit for rectifying the three-phase AC power, and the reactor (7) is arranged between the AC power supply (5) and the converter circuit (2), high frequency current flows through the reactor (7) to increase temperature of the reactor (7) when the switching elements are switched at a high frequency. As a result, an insulator of the reactor (7) is thermally damaged. The amount of heat generated by the reactor (7) corresponds to the power value of the power conversion apparatus (1). Therefore, the reactor (7) can reliably be protected by reducing the output of the inverter circuit (3) in such a manner that the power value is smaller than a predetermined power value at which the insulator of the reactor (7) would not be thermally damaged, like the first aspect of the invention. Further, as described above, the output of the inverter circuit (3) is controlled based on the power value directly associated with the amount of generated heat. This allows more precise output control, and allows more efficient operation of the power conversion apparatus (1) as compared with the conventional configuration in which the output of the inverter circuit (3) is controlled based on the current only.

Advantages of the Invention

Thus, according to the power conversion apparatus (1) of the present invention, the droop control means (30, 40) is provided which reduces the output of the inverter circuit (3) in such a manner that the power value obtained from the input current and the input voltage of the inverter circuit (3) is smaller than the predetermined power value. Therefore, as compared with the conventional configuration in which the output of the inverter circuit (3) is controlled based on the current only, the output control can be performed more precisely, and the power conversion apparatus (1) can be operated more efficiently.

According to the second aspect of the invention, the droop control means (30, 40) is configured to reduce the output of the inverter circuit (3) when the power value remains higher than or equal to the droop control start value (W_H) for the predetermined period of time or longer. Therefore, when reduction in power value is required, the output of the inverter circuit (3) can surely be reduced without erroneous detection due to the noise etc.

According to the third aspect of the invention, the droop control means (30, 40) is configured to finish the droop control when the power value remains lower than or equal to the droop control stop value (W_L) for the predetermined period of time or longer while the droop control is being performed. Therefore, erroneous detection due to noise etc. can be prevented, and the power conversion apparatus (1) can efficiently be operated.

According to the fourth aspect of the invention, the converter circuit (2) includes a plurality of switching elements for rectifying three-phase AC power, and the reactor (7) is provided between the converter circuit (2) and the AC power supply (5). Thus, with the configuration according to the first aspect of the invention applied to this configuration, the reactor (7) can surely be protected, and the power conversion apparatus (1) can efficiently be operated.

DESCRIPTION OF REFERENCE CHARACTERS

Figure 1:
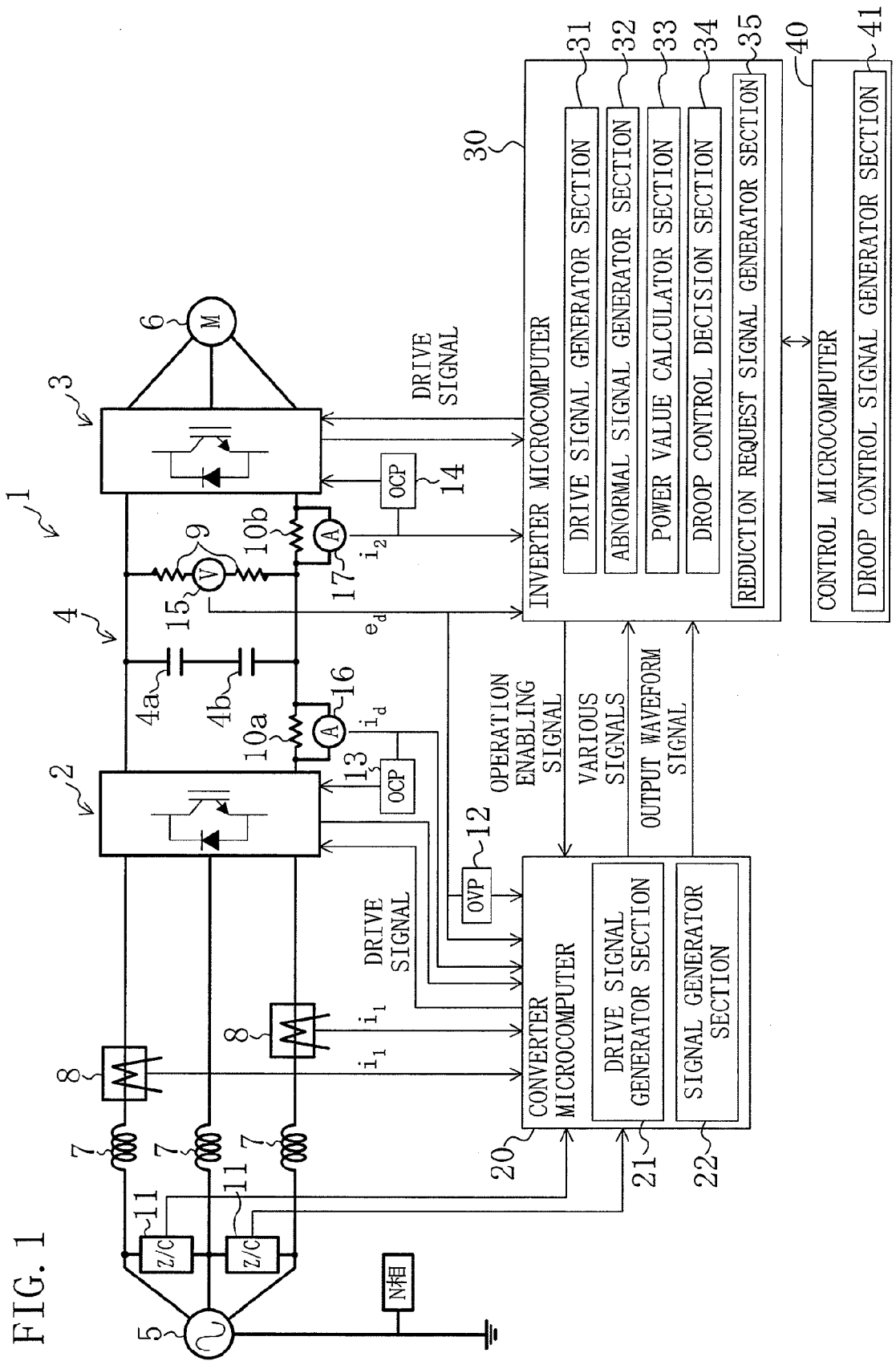
FIG. 1 is a circuit diagram illustrating the schematic structure of a power conversion apparatus according to an embodiment of the invention.

1 Power conversion apparatus
2 Converter circuit
3 Inverter circuit
4 Capacitor circuit
5 Commercial power supply (AC power supply)
6 Electric motor
7 Reactor
15 Voltage sensor (voltage detector means)
16 Current sensor
17 Current sensor (current detector means)
20 Converter microcomputer
21 Drive signal generator section
22 Signal generator section
30 Inverter microcomputer (droop control means)
31 Drive signal generator section
32 Abnormal signal generator section
33 Power value calculator section (power value calculator means)
34 Droop control determining section
35 Reduction request signal generator section
40 Control microcomputer (droop control means)
41 Droop control signal generator section
W_H Droop control start value
W_L Droop control stop value

DESCRIPTION OF EMBODIMENTS

An embodiment of the present invention will be described in detail with reference to the drawings. The following embodiment will be set forth merely for the purpose of preferred examples in nature, and are not intended to limit the scope, applications, and use of the invention.

—General Structure—

The embodiment of the invention will be described below. As shown in FIG. 1, a power conversion apparatus (1) of the present embodiment includes a converter circuit (2), an inverter circuit (3), and a capacitor circuit (4). A commercial power supply (5) for supplying AC power is connected to an input side of the converter circuit (2), and the capacitor circuit (4) and the inverter circuit (3) are connected in parallel to an output side of the converter circuit (2). For example, an electric motor (a motor) (6) of a compressor of an air conditioner etc. is connected to the inverter circuit (3).

The converter circuit (2) is configured to convert three-phase AC power output from the commercial power supply (5) to DC power, and constitutes a so-called rectifier circuit. In general, the converter circuit (2) is comprised of a bridge circuit comprising diodes. In this embodiment, the converter circuit (2) is comprised of switching elements, such as insulated gate bipolar transistors (IGBT), which are three-phase bridge-connected for reducing harmonics. In FIG. 1, the bridge circuit comprising the switching elements is not shown for easy description.

As shown in FIG. 1, reactors (7, 7, 7) are provided on the phases between the converter circuit (2) and the commercial power supply (5), respectively. A zero-crossing detector circuit (11) described later (Z/C in FIG. 1) is provided between the commercial power supply (5) and the rectors (7, 7, 7) in such a manner that the zero-crossing detector circuit is connected to two of the three phases.

DCCTs (8, 8) for detecting current $i_1$ flowing through two of the three phase branches are provided between the reactors (7, 7) and the converter circuit (2). The current on each phase detected by the DCCT (8, 8) is converted to a corresponding signal, sent to a converter microcomputer (10) described later, and is used as one of a parameter for controlling and driving the switching elements of the converter circuit (2).

The capacitor circuit (4) includes two capacitors (4a, 4b) connected in series, and is connected in parallel to the converter circuit (2) and the inverter circuit (3). The capacitor circuit (4) is configured to be able to charge and discharge DC power converted by the converter circuit (2), and to supply the DC power to the inverter circuit (3) by discharging the DC power.

The inverter circuit (3) is configured to convert the DC power discharged from the capacitor circuit (4) to AC power. Specifically, the inverter circuit (3) includes a plurality of switching elements which are three-phase bridge-connected, and is configured to convert DC voltage discharged by the capacitor circuit (4) to AC voltage of a predetermined frequency required by the motor (6). The switching elements used in the inverter circuit (3) may also be switching elements such as IGBTs, as those in the converter circuit (2). In FIG. 1, the bridge circuit comprising the switching elements is not shown for easy description.

Two series-connected resistors (9, 9) are connected between the capacitor circuit (4) and the inverter circuit (3) to be parallel to the capacitor circuit (4) and the inverter circuit (3). Voltage $e_d$ between the resistors (9, 9) is detected by a voltage sensor (15) (a voltage detector means) which measures the DC voltage, is converted to a corresponding signal, and then is sent to a converter microcomputer (20), an inverter microcomputer (30), an overvoltage detector (12) (OVP in FIG. 1) described later, etc. The resistors (9, 9) are provided to input divided voltage to the voltage sensor (15).

The power conversion apparatus (1) includes shunt resistors (10a, 10b) provided on the output side of the converter circuit (2) and the input side of the inverter circuit (3), respectively, to allow current detection by current sensors (16, 17) (a current detector means). Current $i_d$ measured by the current sensor (16) through the shunt resistor (10a) provided on the output side of the converter circuit (2) is converted to a corresponding signal, and is sent to a converter microcomputer (20), an overcurrent detector (13) (OCP in FIG. 1), etc, described later. On the other hand, current $i_2$ measured by the current sensor (17) through the shunt resistor (10b) provided on the input side of the inverter circuit (3) is converted to a corresponding signal, and is sent to an inverter microcomputer (30), an overcurrent detector (14), etc., described later.

The overcurrent detectors (13, 14) are configured to be able to detect an overcurrent state. When the overcurrent state is detected, the overcurrent detectors (13, 14) output a forcing signal to the converter circuit (2) and the inverter circuit (3), respectively, to stop the drive of the switching elements.

A zero-crossing detector circuit (11) is provided on the input side of the power conversion apparatus (1) connected to the commercial power supply (5). The zero-crossing detector circuit (11) is provided to be connected to two of the three phases, and detects a difference between voltages of the two phases to detect a zero-crossing point of the input voltage. The switching elements of the converter circuit (2) are controlled and driven based on the zero-crossing point of the input voltage detected by the zero-crossing detector circuit (11).

The power conversion apparatus (1) including the above-described circuit configuration includes a converter microcomputer (20) for controlling and driving the switching elements of the converter circuit (2), an inverter microcomputer (30) for controlling and driving the switching elements of the inverter circuit (3), and a control microcomputer (40) for sending an operation control signal for the power conversion apparatus (1) to the microcomputers (20, 30).

The converter microcomputer (20) is configured to control the drive of the switching elements of the converter circuit (2) based on the zero-crossing point detected by the zero-crossing detector circuit (11), the current value $i_1$ on the input side detected by the DCCT (8), and the current value $i_d$ on the output side detected by the current sensor through the shunt resistor (10a), the voltage value $e_d$ detected between the resistors (9, 9), etc. Specifically, the converter microcomputer (20) includes a drive signal generator section (21) for generating and outputting a drive signal for driving the switching elements based on the zero-crossing point, the current values on the input and output sides, the voltage value, etc.

The converter microcomputer (20) is configured to detect overcurrent based on the DC current $i_d$ measured through the shunt resistor (10a) provided on the output side of the converter circuit (2). Specifically, when the DC current $i_d$ measured through the shunt resistor (10a) is detected as the overcurrent by the overcurrent detector (13), the overcurrent detector (13) sends a forcing signal to the switching elements of the converter circuit (2) to stop the drive of the switching elements. Then, the converter microcomputer (20) detects that the switching elements of the converter circuit (2) are not driven. Thus, the converter microcomputer (20) recognizes the overcurrent state.

When an overvoltage state is detected based on the voltage $e_d$ between the resistors (9, 9) measured by the voltage sensor (15), the detection result is input as a signal to the converter microcomputer (20). Specifically, the voltage $e_d$ measured by the voltage sensor (15) is input to the overvoltage detector (12), and the overvoltage detector (12) detects the overvoltage state. When the overvoltage state is detected by the overvoltage detector (12), an overvoltage signal is sent to the converter microcomputer (20), and the overvoltage is detected by the converter microcomputer (20).

The converter microcomputer (20) is configured to generate different signals depending on an abnormal event occurred in the converter circuit (2). Specifically, the converter microcomputer (20) includes a signal generator section (22) which generates a signal in accordance with the abnormal event. Examples of the abnormal event that would occur in the converter microcomputer (20) include, malfunction of the DCCT (8) or the current sensor (16, 17) provided with the shunt resistor (10a), malfunction of the voltage sensor (15) which detects the voltage $e_d$ between the resistors (9, 9) when the overvoltage state is detected by the overvoltage detector (12), an instantaneous overcurrent state detected through the operation of the overcurrent detector (13), failure in synchronization of the switching elements relative to a power supply frequency (deviation between the actual zero-crossing point and the zero-crossing point detected by the microcomputer (20)), phase reversal or phase interruption of the input voltage, an abnormal zero-crossing signal, malfunction of the switching elements, etc.

The converter microcomputer (20) is connected to the inverter microcomputer (30) through a plurality of ports. When a signal is generated by the signal generator section (22), the signal is sent to the inverter microcomputer (30) through a port for signals only. Further, the converter microcomputer (20) is configured to send an output waveform signal representing an waveform of the output from the converter circuit (2) to the inverter microcomputer (30) through an exclusive port, and to receive an operation enabling signal (a signal related to whether the converter circuit (2) is driven or not) from the inverter microcomputer (30) through an exclusive port.

The inverter microcomputer (30) is configured to control and drive the switching elements of the inverter circuit (3) based on the output of the voltage sensor (15) which detects the voltage $e_d$ between the resistors (9, 9), the output of the current sensor (17) through the shunt resistor (10b), the output waveform signal sent from the converter microcomputer (20), etc. Specifically, the inverter microcomputer (30) includes a drive signal generator section (31) for generating a drive signal for driving the switching elements based on the detected voltage and current values, etc.

The inverter microcomputer (30) includes an abnormal signal generator section (32) for generating an abnormal signal when an abnormal event occurs in the inverter circuit (3). For example, the abnormal signal generator section (32) is configured to generate an abnormal signal when malfunction of the switching elements of the inverter circuit (3) is detected, or the overcurrent is detected by the overcurrent detector (14). When the abnormal signal is generated by the abnormal signal generator section (32), the signal is sent to the control microcomputer (40). Then, the control microcomputer (40) outputs an operation stop signal for instructing the inverter microcomputer (30) to stop the drive of the inverter circuit (3).

Although not shown, the inverter microcomputer (30) is configured to generate a flag or a code based on the signal sent from the converter microcomputer (20), and to generate a wait request signal when the converter circuit (2) and the inverter circuit (3) have to stop driving. When the wait request signal is generated, the inverter microcomputer (30) sends the generated signal to the control microcomputer (40), and the control microcomputer (40) outputs an operation stop signal for stopping the converter circuit (2) and the inverter circuit (3) to the inverter microcomputer (30).

The inverter microcomputer (30) and the control microcomputer (40) are connected through serial or parallel communication to make signal communication possible.

The control microcomputer (40) is configured to control the operation of the power conversion apparatus (1), and to output an operation control signal for controlling the drive of the converter circuit (2) and the inverter circuit (3) to the inverter microcomputer (30). As described above, the control microcomputer (40) is configured to output the operation stop signal when the abnormal signal or the wait request signal is received from the inverter microcomputer (30).

—Droop Control—

In the above-described power conversion apparatus (1) in which the converter circuit (2) includes a plurality of switching elements, and the reactors (7) are arranged between the converter circuit (2) and the commercial power supply (5), high frequency current flows through the reactors (7) when the switching elements are switched at a high frequency, and the reactors (7) generate heat to increase its temperature. Then, an insulator in the reactor (7) may thermally be damaged.

In view of this disadvantage, according to the present invention, droop control is performed to reduce the output of the inverter circuit (3) based on a power value obtained from primary voltage and current of the inverter circuit (3) to prevent temperature increase in the reactors (7).

Specifically, the inverter microcomputer (30) includes a power value calculator section (33) (a power value calculator means) which obtains a power value from the primary current and voltage of the inverter circuit (3), a droop control decision section (34) which determines whether the droop control is necessary or not based on the power value, and a reduction request signal generator section (35) which generates a reduction request signal when the droop control decision section (34) has determined that the droop control has to be performed.

The power value calculator section (33) is configured to calculate the power value from the DC voltage detected by the voltage sensor (15) arranged between the resistors (9, 9), and the DC current detected by the current sensor (17) through the shunt resistor (10b).

The droop control decision section (34) determines whether the droop control has to be performed or not based on the power value calculated by the power value calculator section (33). The droop control decision section (34) is configured to compare the power value with a droop control start value and a droop control stop value, and to determine whether the droop control is started or finished based on the comparison result.

Specifically, when the power value remains higher than or equal to the droop control start value for a predetermined period of time (5 sec in this embodiment) or longer, the droop control decision section (34) determines that the droop control has to be performed, and instructs the reduction request signal generator section (35) to generate the reduction request signal. On the other hand, when the power value remains lower than or equal to the droop control stop value for a predetermined period of time (5 sec in this embodiment) or longer while the droop control is performed, the droop control decision section (34) determines that the droop control is no longer necessary, and instructs the reduction request signal generator section (35) to stop the generation of the reduction request signal.

The droop control start value is a power value at which the droop control is required to reduce the amount of heat generated by the reactors (7). The droop control start value is set to a value which is sufficiently lower than a power value corresponding to a threshold amount of heat generation below which the insulator of the reactor (7) is not damaged (a predetermined power value), and which would not reach the power value corresponding to the threshold amount of heat generation even when the power conversion apparatus (1) is continuously operated for the predetermined period of time. The droop control stop value is a power value at which the amount of heat generation by the reactor (7) is sufficiently small, and the droop control is not necessary. The droop control stop value is set to a value lower than the droop control start value.

The predetermined period of time is determined in such a manner that the magnitude of the power value can precisely be compared with the droop control start value and the droop control stop value without being affected by noise, if contained in the detected current or voltage.

Although not shown, the droop control decision section (34) includes a timer which measures time for which the power value remains higher than or equal to the droop control start value, and time for which the power value remains lower than or equal to the droop control stop value.

The reduction request signal generator section (35) is configured to generate the reduction request signal when upon receiving instruction from the droop control decision section (34) to generate the reduction request signal, and to stop the generation of the reduction request signal upon receiving instruction to stop the generation. The reduction request signal generated by the reduction request signal generator section (35) is sent to the control microcomputer (40).

The control microcomputer (40) includes a droop control signal generator section (41) which generates a control signal for the droop control when the reduction request signal generated by the reduction request signal generator section (35) is received. The droop control signal generator section (41) is configured to generate the control signal only while the reduction request signal is received.

The control signal generated by the droop control signal generator section (41) is sent to the inverter microcomputer (30). When the control signal is received by the inverter microcomputer (30), an output frequency of the inverter circuit (3) is reduced to reduce the number of revolutions of the electric motor (6). When the inverter microcomputer (30) no longer receives the control signal, the output frequency of the inverter circuit (3) is changed to return the number of revolutions of the electric motor (6) to the intended number of revolutions.

Thus, according to this embodiment, the inverter microcomputer (30) and the control microcomputer (40) constitute a droop control means of the present invention.

The droop control operation of the power conversion apparatus (1) configured as described above will be described with reference to a flow chart in FIG. 2, and a time chart in FIG. 3.

Figure 2:
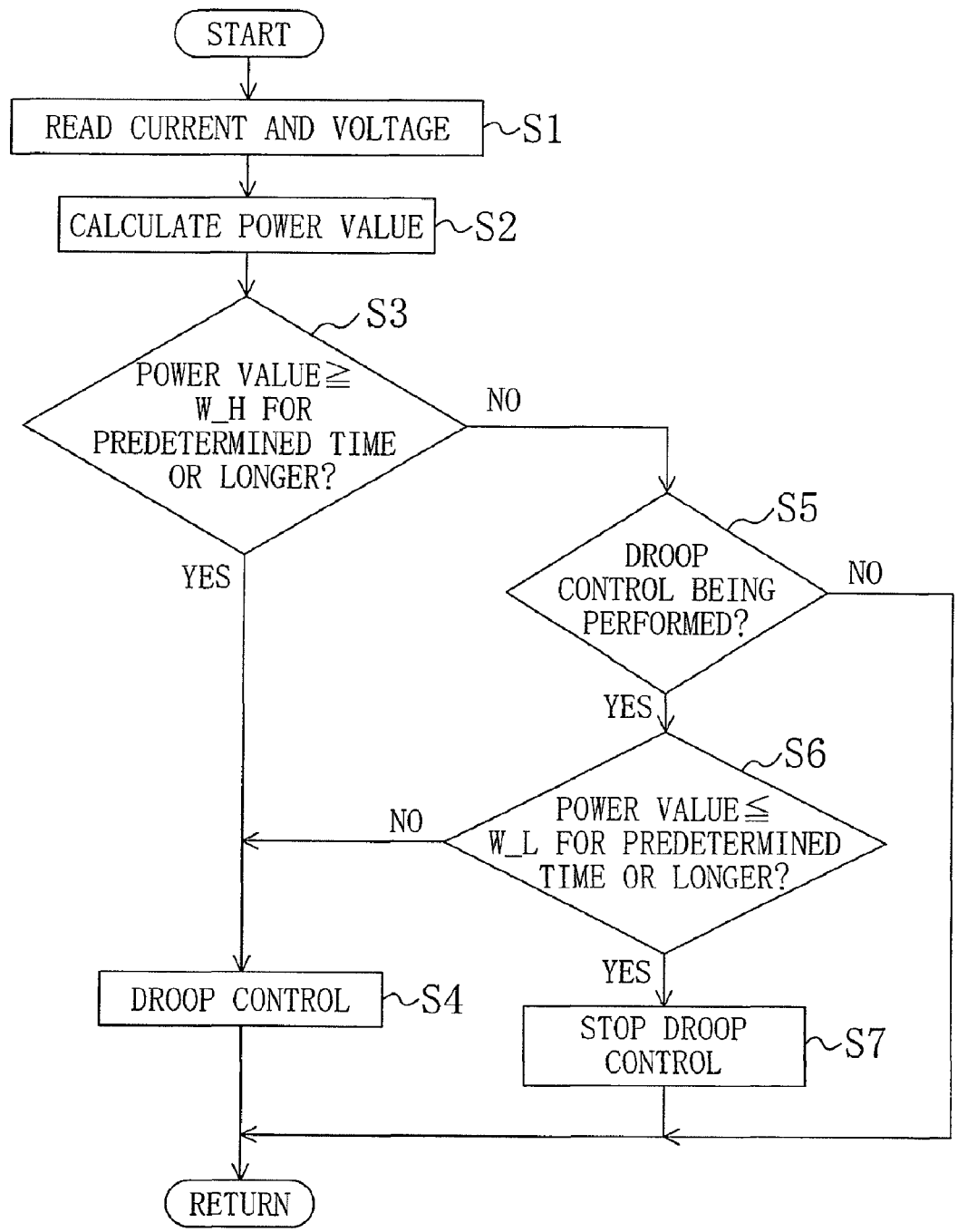
FIG. 2 is a flow chart illustrating a control flow of droop control.

First, once a process is started along the flow chart of FIG. 2, the inverter microcomputer (30) reads a current value from the current sensor (17), and a voltage value from the voltage sensor (15) in step S1, and the power value calculator section (33) calculates a power value from the current value and the voltage value in subsequent step S2.

In step S3, the droop control decision section (34) determines whether the power value remains higher than or equal to the droop control start value (W_H) for a predetermined period of time (e.g., 5 minutes) or longer. When a determination is made in step S3 that the power value remains higher than or equal to the droop control start value (W_H) for the predetermined period of time or longer (YES is selected), a reduction request signal generated by the reduction request signal generator section (35) is output to the control microcomputer (40) in step S4, and a control signal is generated in the control microcomputer (40) to perform the droop control. Then, the process is finished, and is returned to the start (RETURN).

On the other hand, a determination is made that the power value is not higher than or equal to the droop control start value (W_H) for the predetermined period of time or longer (NO is selected), the process proceeds to step S5, and a determination is made whether the droop control is being performed or not. The determination whether the droop control is being performed or not can be made based on the on/off state of a flag which is set to be switched on when the droop control is being performed in step S4.

When a determination is made that the droop control is not performed in step S5 (NO is selected), the process is finished, and is returned to the start (RETURN). When a determination is made that the droop control is being performed in step S5 (YES is selected), the droop control decision section (34) determines whether the power value is lower than or equal to the droop control stop value (W_L) for a predetermined period of time (e.g., 5 minutes) or longer in subsequent step S6.

When a determination is made is step S6 that the power value is not lower than or equal to the droop control stop value (W_L) for the predetermined period of time or longer (NO is selected), the process proceeds to step S4 to continue the droop control, and is returned to the start (RETURN). On the other hand, when a determination is made in step S6 that the power value is lower than or equal to the droop control stop value (W_L) for the predetermined period of time or longer (YES is selected), a determination is made that the droop control is no longer necessary. Then, the generation of the reduction request signal by the reduction request signal generator section (35) is stopped in subsequent step S7 to stop the droop control. Then, the process is finished, and is returned to the start (RETURN).

Figure 3:
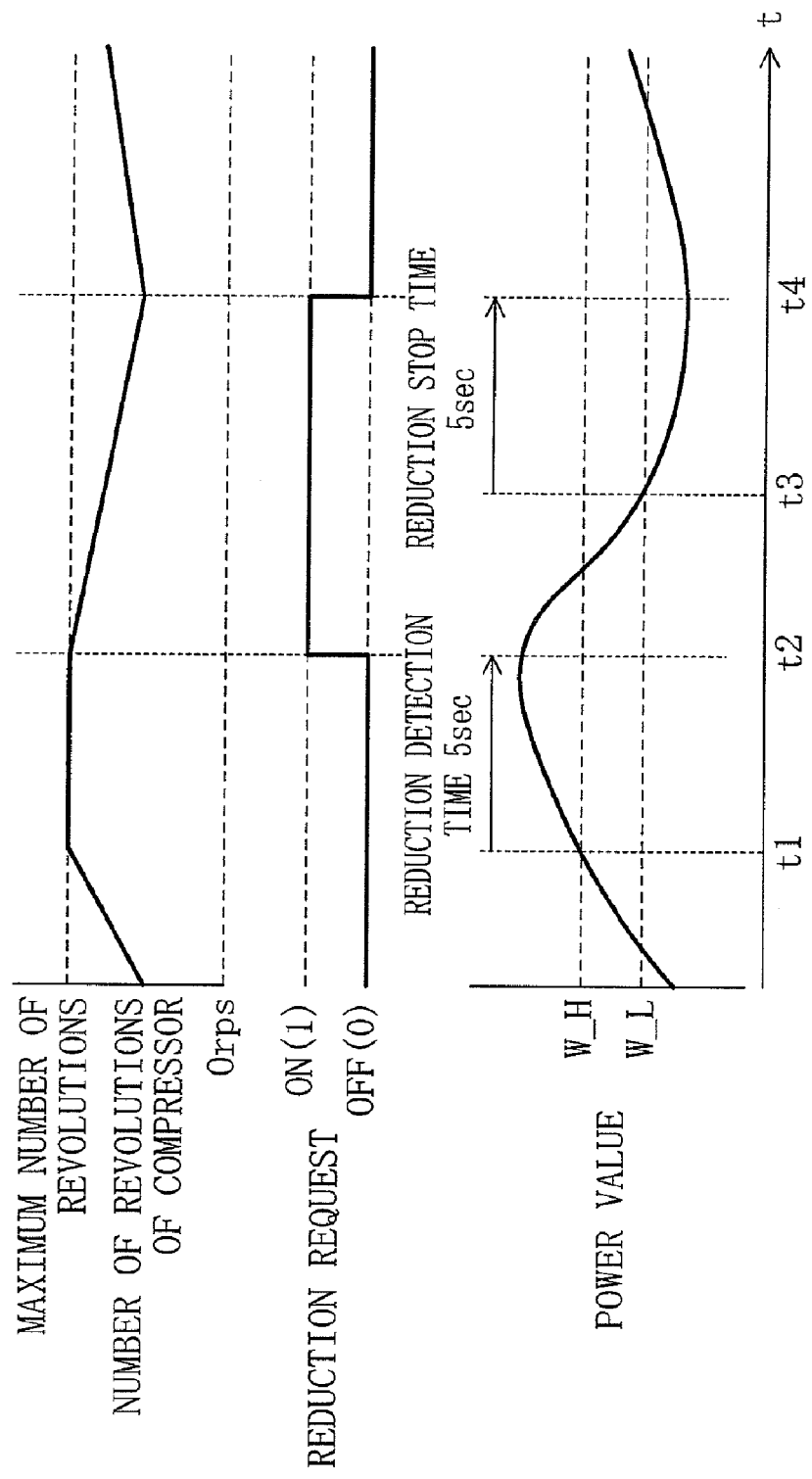
FIG. 3 is a time chart illustrating an example of droop control based on a power value corresponding to the DC component.

FIG. 3 shows an example of performing and stopping the above-described droop control. The control according to the example of FIG. 3 will be described in detail below.

As shown in FIG. 3, the power value calculated by the power value calculator section (33) increases as the number of revolutions of the electric motor (6) of the compressor increases. When the power value is higher than or equal to the droop control start value (W_H), and this state is kept for 5 seconds or longer at t1, the droop control decision section (34) instructs the reduction request signal generator section (35) to generate the reduction request signal at t2, and the reduction request signal generator section (35) generate the reduction request signal (the ON state in FIG. 3). At this time, the number of revolutions of the electric motor (6) is the maximum in the example of FIG. 3.

When the reduction request signal generator section (35) generates the reduction request signal, the droop control signal generator section (41) of the control microcomputer (40) generates a control signal to perform the droop control, and the control signal is output to the inverter microcomputer (30). Then, the inverter microcomputer (30) performs the droop control to reduce the output of the inverter circuit (3) in order to gradually reduce the number of revolutions of the motor (6). Thus, the power value calculated by the power value calculator section (33) is reduced.

When the power value is lower than or equal to the droop control stop value (W_L), and this state is kept for 5 seconds or longer at t3, the droop control decision section (34) instructs the reduction request signal generator section (35) to stop the generation of the reduction request signal, and the reduction request signal generator section (35) stops the generation of the reduction request signal at t4. Then, the droop control signal generator section (41) of the control microcomputer (40) also stops the generation of the control signal, and the droop control by the inverter microcomputer (30) is stopped.

In this way, the inverter microcomputer (30) increases the output frequency of the inverter circuit (3) to return the number of revolutions of the electric motor (6) to the intended number of revolutions.

Advantages of Embodiment

According to the embodiment described above, the power value is obtained from the primary DC current and DC voltage of the inverter circuit (3), and the output (the output frequency) of the inverter circuit (3) is reduced by droop control in such a manner that the power value reaches a power value at which the insulator of the reactor (7) arranged between the converter circuit (2) and the commercial power supply (5) would not thermally be damaged. Therefore, as compared with the configuration in which the output of the inverter circuit (3) is controlled based on the current only, the power conversion apparatus (1) can efficiently be operated without providing an unnecessary margin for the threshold.

Specifically, in the case where the output of the inverter circuit (3) is controlled based on the current only, a threshold of the current has to be determined in consideration of fluctuations in voltage, and the power conversion apparatus (1) has to be operated at a temperature reduced more than required relative to the threshold temperature of the reactor (7). This results in inefficient operation. However, with the output of the inverter circuit (3) controlled based on the power value corresponding to the amount of heat generated by the reactor (7) as described above, the operation can be performed in a range as wide as possible without exceeding the threshold temperature of the reactor (7), thereby allowing efficient operation.

The power conversion apparatus (1) is configured to start the droop control when the power value remains higher than or equal to the droop control start value (W_H) for the predetermined period of time or longer, and to finish the droop control when the power value remains lower than or equal to the droop control stop value (W_L) for the predetermined time or longer. This can surely prevent the power value from reaching a power value at which the temperature of the reactor (7) exceeds the threshold temperature, and can prevent unwanted droop control. Further, as described above, in determining the start and stop of the droop control, a determination is made whether the power value remains higher than or equal to the droop control start value (W_H), or remains lower than or equal to the droop control stop value (W_L), thereby reliably preventing erroneous detection due to noise etc.

Other Embodiments

The above-described embodiment may be modified in the following manner.

According to the above-described embodiment, the IGBTs are used as the switching elements constituting the converter circuit (2) and the inverter circuit (3). However, the switching elements are not particularly limited to the IGBTs, and other switching elements can be used, such as MOS-FETs.

According to the above-described embodiment, the droop control start value is determined as a value which is sufficiently lower than the power value corresponding to the threshold amount of heat generation below which the insulator of the reactor (7) is not damaged (the predetermined power value), and which would not reach the power value corresponding to the threshold amount of heat generation even when the power conversion apparatus (1) is continuously operated for the predetermined period of time for the purpose of protecting the reactor (7). However, the droop control start value may be determined for the purpose of protecting the other components. The droop control start value is not limited to the value determined for the purpose of protecting the components, but may be determined for power saving etc.

According to the above-described embodiment, the droop control signal generator section (41) is provided in the control microcomputer (40), and a control signal for the droop control is generated by the droop control signal generator section (41). However, the droop control signal generator section may be arranged in the inverter microcomputer (30) to instruct the control based on the determination made by the inverter microcomputer (30) itself as to whether the droop control is required or not.

INDUSTRIAL APPLICABILITY

As described above, the present invention is particularly useful for a power conversion apparatus including a converter circuit and an inverter circuit.

The invention claimed is:

1. A power conversion apparatus comprising:
   a converter circuit which is connected to an AC power supply, and converts AC power to DC power;
   an inverter circuit which converts the DC power converted by the converter circuit to AC power of a predetermined frequency;
   a current detector which is configured to detect input current input from the converter circuit to the inverter circuit;
   a voltage detector which is configured to detect input voltage input from the converter circuit to the inverter circuit;
   a power value calculator which is configured to obtain a power value from the input current detected by the current detector and the input voltage detected by the voltage detector; and
   a droop controller which is configured to reduce output of the inverter circuit in such a manner that the power value obtained by the power value calculator is lower than a predetermined power value, wherein
   the droop controller is configured to reduce the output of the inverter circuit when the power value remains higher than or equal to a droop control start value, which is a value lower than the predetermined power value, for a predetermined period of time or longer.

2. The power conversion apparatus of claim 1, wherein
   while the output of the inverter circuit is being reduced, the droop controller is configured to finish the output reduction when the power value remains lower than or equal to a droop control stop value, which is a value lower than the droop control start value, for a predetermined period of time or longer.

3. The power conversion apparatus of claim 1, wherein
   the converter circuit includes a plurality of switching elements constituting a rectifier circuit for rectifying three-phase AC power, and
   a reactor is provided between the AC power supply and the converter circuit.

* * * * *